(12) United States Patent
Bresolin et al.

(10) Patent No.: US 10,524,456 B2
(45) Date of Patent: Jan. 7, 2020

(54) FILTERING DEVICE FOR AQUARIUMS AND THE LIKE

(71) Applicant: Rolf C. Hagen Inc., Montreal (CA)

(72) Inventors: Valerio Bresolin, Vicenza (IT); Robert Reid, St. Lazare (CA)

(73) Assignee: Rolf C. Hagen Inc., Montreal (CA)

( * ) Notice: Subject to any disclaimer, the term of this patent is extended or adjusted under 35 U.S.C. 154(b) by 174 days.

(21) Appl. No.: 15/313,985

(22) PCT Filed: May 18, 2015

(86) PCT No.: PCT/IT2015/000136
§ 371 (c)(1),
(2) Date: Nov. 25, 2016

(87) PCT Pub. No.: WO2015/181842
PCT Pub. Date: Dec. 3, 2015

(65) Prior Publication Data
US 2018/0263224 A1 Sep. 20, 2018

(30) Foreign Application Priority Data
May 26, 2014 (IT) .............................. VE2014A0032

(51) Int. Cl.
*A01K 63/04* (2006.01)
(52) U.S. Cl.
CPC ........ *A01K 63/045* (2013.01); *C02F 2209/44* (2013.01)
(58) Field of Classification Search
CPC ........................... A01K 63/045; C02F 2209/44
(Continued)

(56) References Cited

U.S. PATENT DOCUMENTS 3,886,902 A * 6/1975 Haynes .................. A01K 63/10
119/224
4,052,960 A * 10/1977 Birkbeck ............... A01K 61/00
119/227
(Continued)

OTHER PUBLICATIONS

International Search Report and Written Opinion for Application No. PCT/IT2015/000136 dated Oct. 19, 2015.
(Continued)

*Primary Examiner* — Fred Prince
(74) *Attorney, Agent, or Firm* — Wolf, Greenfield & Sacks, P.C.

(57) ABSTRACT

Filtering device (20) to draw water from an aquarium and the like and make water circulate inside, including a container (30) comprising a first housing portion (32) having a first inlet (174) and a second inlet (176) for the entry of water taken from the aquarium into the first housing portion (32) which is able to contain at least one filter for filtering water, further including a flow control device (50) having an entry (60) for taking water from the aquarium and it has two operating positions, a first operating position or filtering position wherein the entry (60) is in communication with the first inlet (174), so that water taken from the aquarium is put into the first housing portion (32), passes through the first inlet (174), is filtered and then is put back into the aquarium, and a second operating position or cleaning position or backwash position, wherein the entry (60) is in communication with the second inlet (176), water taken from the aquarium enters into the first housing portion (32) through the second inlet (176), so reversing the flow of water inside the first housing portion (32) and then is discharged so cleaning the filters.

13 Claims, 14 Drawing Sheets

(58) Field of Classification Search
USPC ......... 210/167.21, 167.25, 167.27, 138, 143; 119/259, 260
See application file for complete search history.

(56) References Cited

U.S. PATENT DOCUMENTS

| | | |
|---|---|---|
| 5,932,092 A | 8/1999 | Hawk et al. |
| 6,447,675 B1 | 9/2002 | James |
| 2006/0021920 A1 | 2/2006 | Forbes et al. |

OTHER PUBLICATIONS

International Preliminary Report on Patentability for Application No. PCT/IT2015/000136 dated Dec. 8, 2016.

* cited by examiner

FILTERING DEVICE FOR AQUARIUMS AND THE LIKE

RELATED APPLICATIONS

This application is a national stage filing under 35 U.S.C. § 371 of international PCT application, PCT/IT2015/000136, filed May 18, 2015, which claims priority to Italian patent application, VE2014A000032, filed May 26, 2014, each of which is incorporated herein by reference in its entirety.

The present invention relates to a filtering device for water of aquariums and the like.

It is known to use similar devices to filter and purify water of aquariums in order to create and maintain an ideal habitat for animals and plants contained therein.

These devices, although efficient, require maintenance and a regular and continued cleaning.

In fact, it is necessary to remove and clean the filters contained inside these devices, so that they can continue to do regularly the filtering function.

This operation usually occurs manually, namely it is necessary to remove the cover of the filtering device in order to access the filters, remove the filters from the container in which they are housed, cleaning them usually with running water or better using water of the aquarium and, then, replace the filters inside the housing container.

This operation is very long and laborious.

Moreover, due to difficulties, there is a risk that an operation so important will not he performed regularly with negative consequences for the flora and fauna in the aquarium.

It has been devised a system to facilitate the washing of the filters made by a filtering device having a discharge outlet on the bottom connected to an opening formed on the bottom of the aquarium which is connected to the outside onto which a tap is applied outside which is normally closed.

When the cleaning of the filters is required, it is necessary to open the tap and the water which is contained in the aquarium passes through the filter, cleaning it and then it is discharged outside. When the filters are cleaned enough, the tap is closed.

Then, it is necessary to provide for the replenishment, that is putting inside the aquarium an amount of water substantially equal to the amount of water previously expelled.

Although this system makes the cleaning of the filters easier, it has however various drawbacks.

First, this system is somewhat complex and expensive.

In fact, it is necessary to make an opening at the bottom of the aquarium, realize a filtering device equipped with an outlet at the lower end able to be attached in a waterproof manner to the opening at the bottom of the aquarium and place a tap at the bottom of the aquarium.

Moreover, the system is also less adaptable because it is designed to the specific aquarium and it cannot be separated from it.

Furthermore, there may be a leak at the bottom of the aquarium where there is the tap.

There is also the risk to forget or not to perform these operations in due course. This system also requires regular maintenance to be maintained efficiently and, often, the maintenance operations are difficult.

Finally, another drawback occurs when feeding the animals contained in the aquarium, since there is the risk that the food is sucked and pumped inside the filtering device and, therefore, in addition to subtract food to animals, the filter can clog and function not properly.

The aim of the filtering device of the present invention is therefore to overcome the drawbacks mentioned above with reference to the prior art.

In particular, the device must be simple and easy to construct, so as to be inexpensive and the maintenance occurs in a simple way.

Moreover, the device must allow the passage from the filtering mode to the cleaning mode of the filters, and vice versa, in a simple and fast manner.

The filtering device must also be fit to any aquarium without making changes to the aquarium to adapt it to the filtering device.

Another aim is the possibility of programming, the cleaning of the filters, so that it occurs automatically and, then, no longer worry to make it regularly.

These aims are achieved by a device for filtering water according to claim 1.

In this way, if the water taken from the aquarium have to be filtered (filtering mode), it flows in a determined direction inside the first housing portion containing the filter and, then, it is put back into the aquarium. If, however, the filters have to be cleaned (washing mode or backwash), water taken from the aquarium flows in the opposite direction to the previous one and, finally, it is expelled from the aquarium.

It is worthing note that the dirtier side of the filter is the entry side of water during filtering mode and the exit side is the cleaner side. So, during the washing mode, when the reversal of the direction of water occurs, the cleaner side becomes the entry side of the water and the dirtier side becomes the exit side of the water so the water. entering from the cleaner side and exiting from the dirtier one, draws away the dirt contained in the filter and cleans it.

Furthermore, the device is simple and easy to produce, as well as its maintenance.

It can be applied to any aquarium without making changes to the aquarium.

Preferably, the device includes a flow control device comprising a motor able to cause the control device to take the different operating positions.

Preferably, said device comprises a timer connected to said motor so as to program the different operating positions.

Thus, it is possible to program the operations of filtering and washing of the filters according to the specific requirements, then relieving the person from this duty.

These and other advantages of the present invention will be more evident from the following detailed description of an embodiment thereof, provided for illustrative and not limitative purposes with reference to the following drawings wherein.

Figure 1:
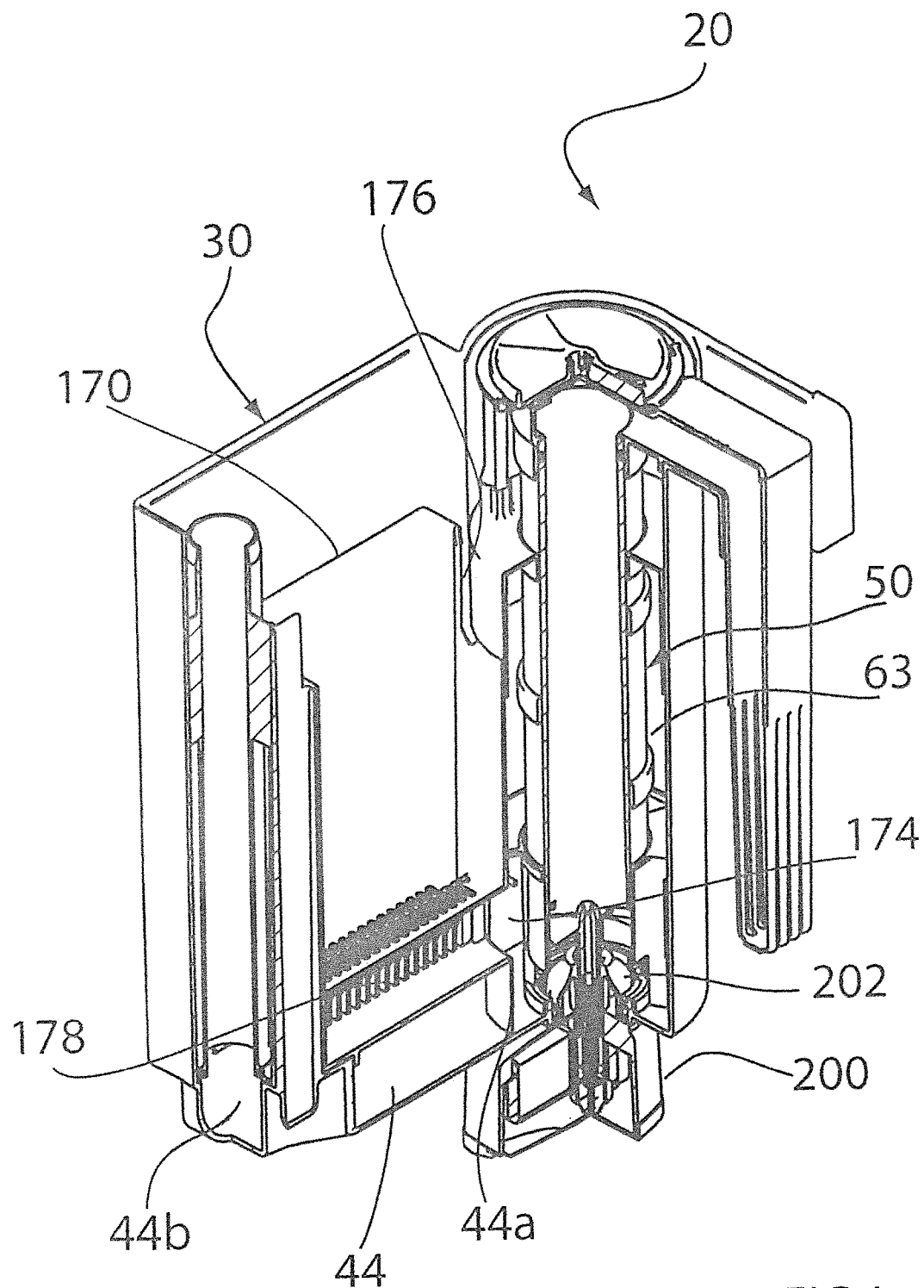
FIG. 1 is a perspective view of a filtering device according to the invention.

In FIG. 1, generally indicated with 20, is a filtering device for water of aquariums or the like.

Figure 3:
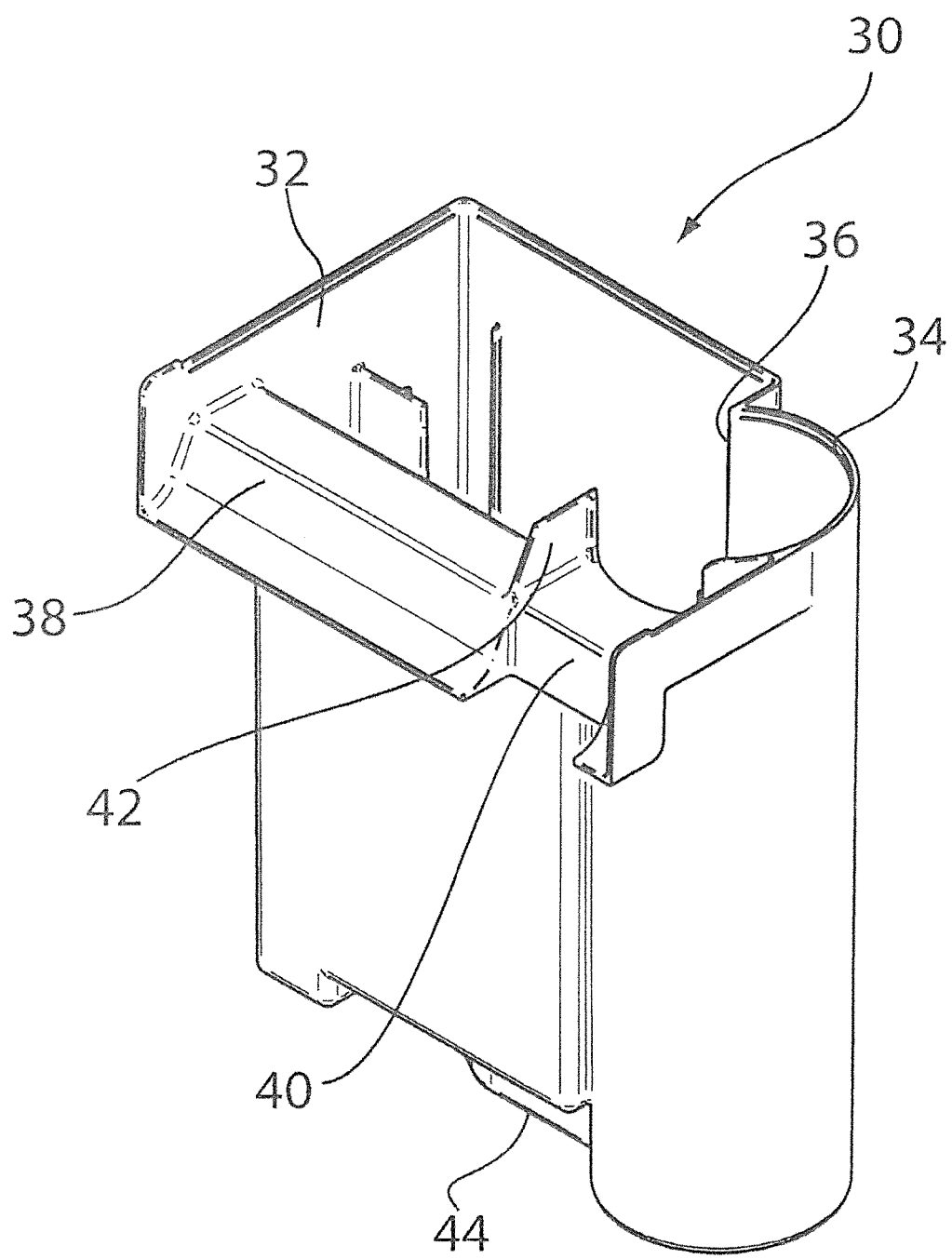
FIG. 3 is a perspective view of the container of the device of FIG. 1.

The filtering device 20 comprises a container 30 (see FIG. 3), a flow control device 50 (see FIG. 4) and an assembly 180 (see FIG. 12) both contained within the container 30, and a pump 200.

The container 30 comprises a first housing portion 32 for one or more filters, preferably with parallelepipedic shape, and a second section 34 with an essentially cylindrical shape. The filter can be composed by one or more filters, and each filter can be a cartridge filter or any other filter, for example it can be composed by one or more layers of loose materials or filtering compounds.

The two portions 32 and 34 are adjacent and communicating therebetween through a vertical opening 36.

On the top of the container 30 there is a lowered edge onto which a first hook-shaped tab 38 is formed on the side of the first portion 32 and a second hook-shaped tab 40 is formed on the side of the second portion 34, both tabs are able to be attached to the upper edge of an aquarium. The two tabs 38 and 40 are divided by a partition 42.

Figure 2:
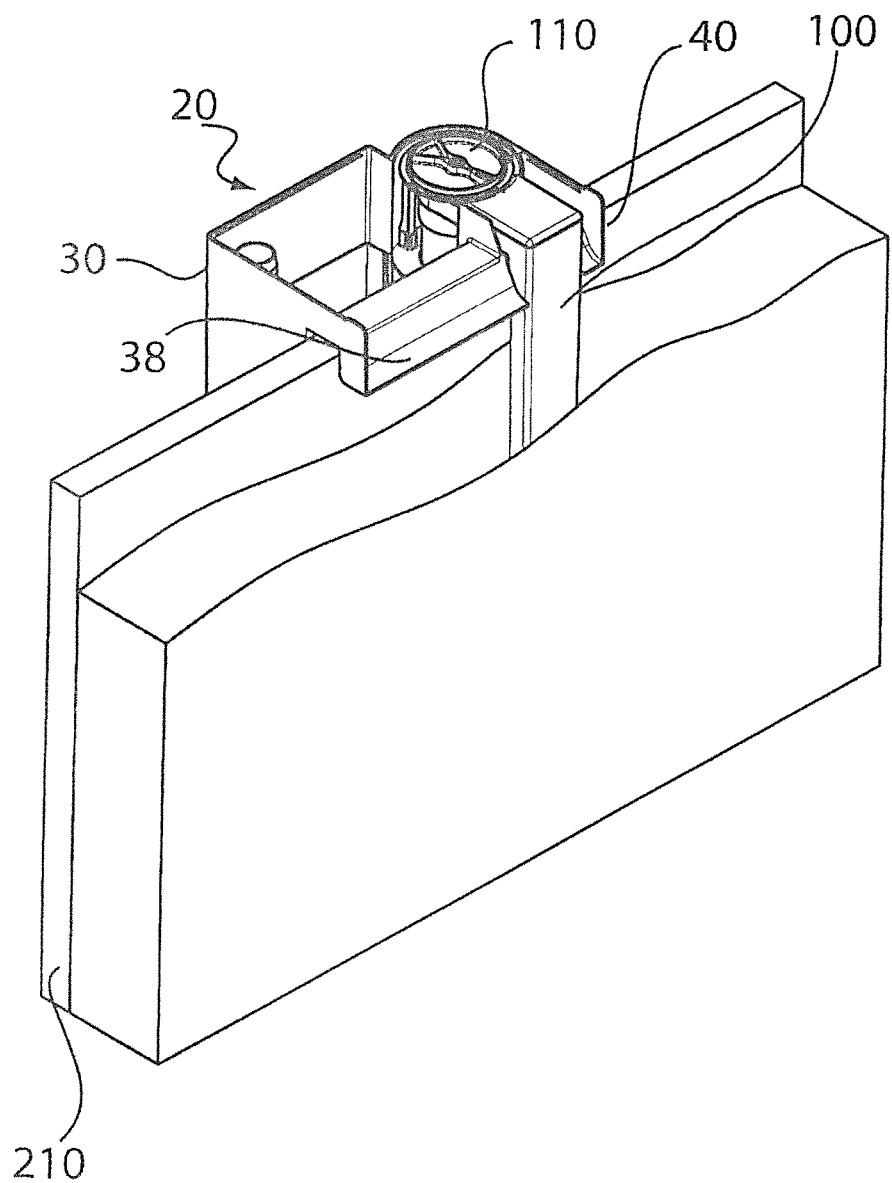
FIG. 2 is a perspective view of the device of FIG. 1 applied to a wall of an aquarium.

The two tabs 38, 40 allow the container 30 to be hooked to the upper edge of a wall 210 of an aquarium (as shown in FIG. 2) and, moreover, the first tab 38 allows filtered water contained in the first portion 32 to come out and put back into the aquarium, as it will be better described hereinafter.

A discharge duct 44 is made at the bottom of the first portion 32 of the container 30 having two opposing ends: a first end 44a connected to the second portion 34 thus defining a discharge outlet 44a and a second end 44b. The function of the discharge duct 44, as it will be better explained below, is to discharge outside water taken from the aquarium.

A control device 50 is housed inside the second portion 34.

Figure 4:
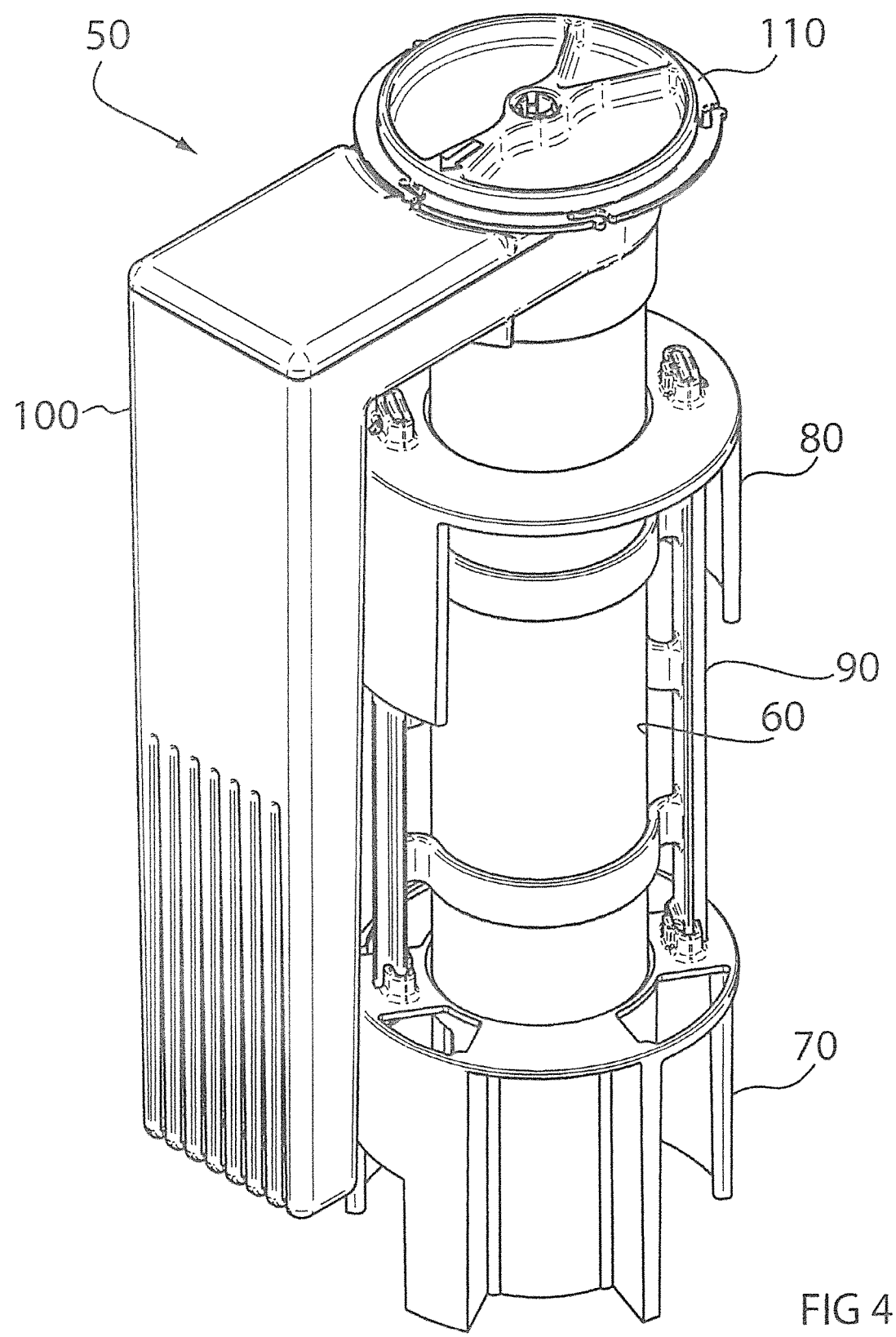
FIG. 4 is a perspective view of the flow control device of the device of FIG. 1.
Figure 5:
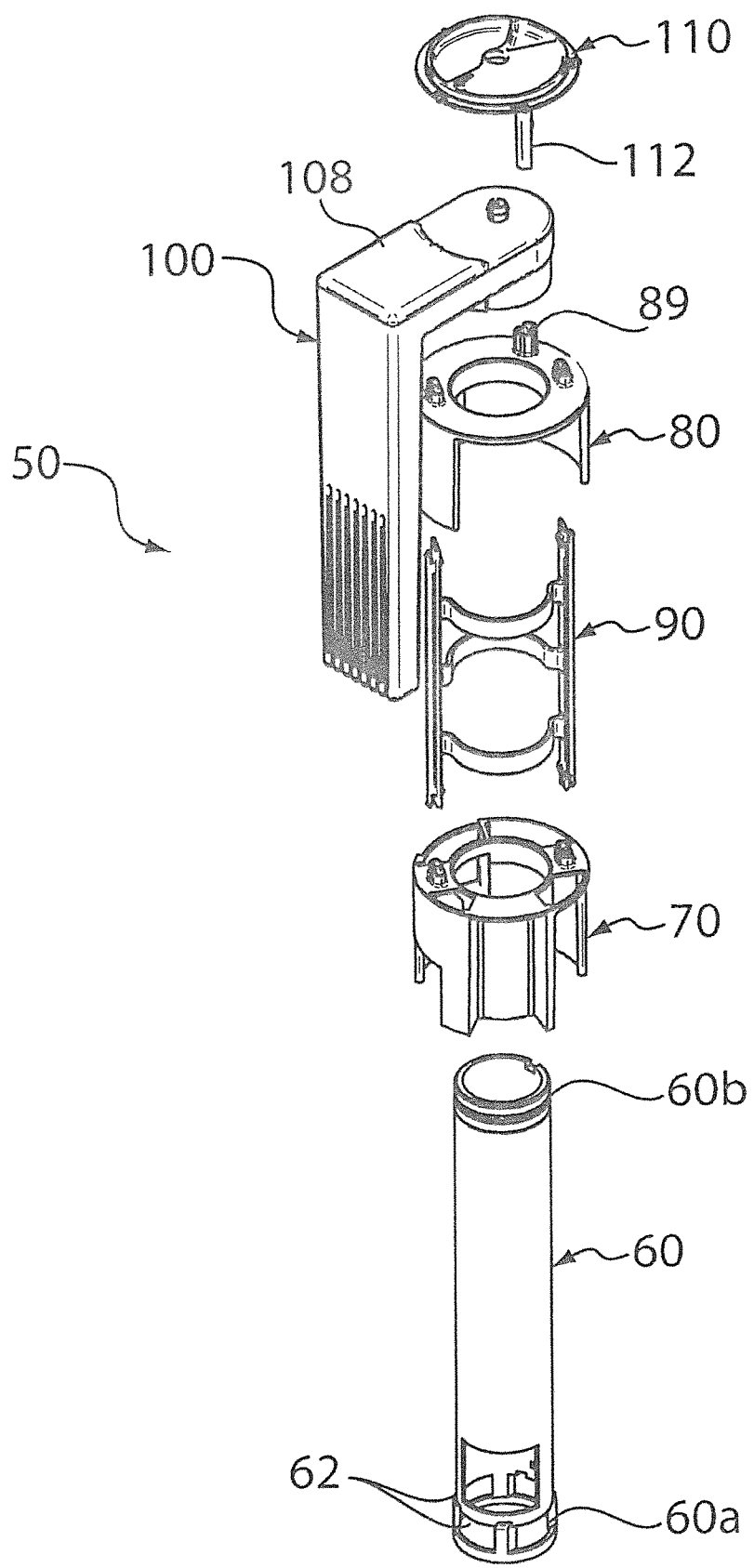
FIG. 5 is an exploded perspective view of the flow control device of the device of FIG. 4.

The control device 50, as better shown in FIGS. 4 and 5, comprises a control tube or water entry 60 through which flows the water taken from the aquarium and it has two ends: a lower end 60a and an upper end 60b. The water taken from the aquarium enters at the upper end 60b, while at the lower end 60a openings 62 are formed from which the water comes out, as it will be better described hereinafter.

The outer diameter of the control tube 60 is less than the inner diameter of the second cylindrical portion 34, so as to define a hollow space 63 between the second cylindrical portion 34 and the control tube 60.

The control device 50 also includes a lower cylindrical body 70 inside which it is inserted and fixed the lower end 60a of the control tube 60 and an upper cylindrical body 80 inside which is inserted and fixed the upper end 60b of the control tube 60.

The lower cylindrical body 70 and the upper cylindrical body 80 are joined together by a spacer 90.

Figure 7:
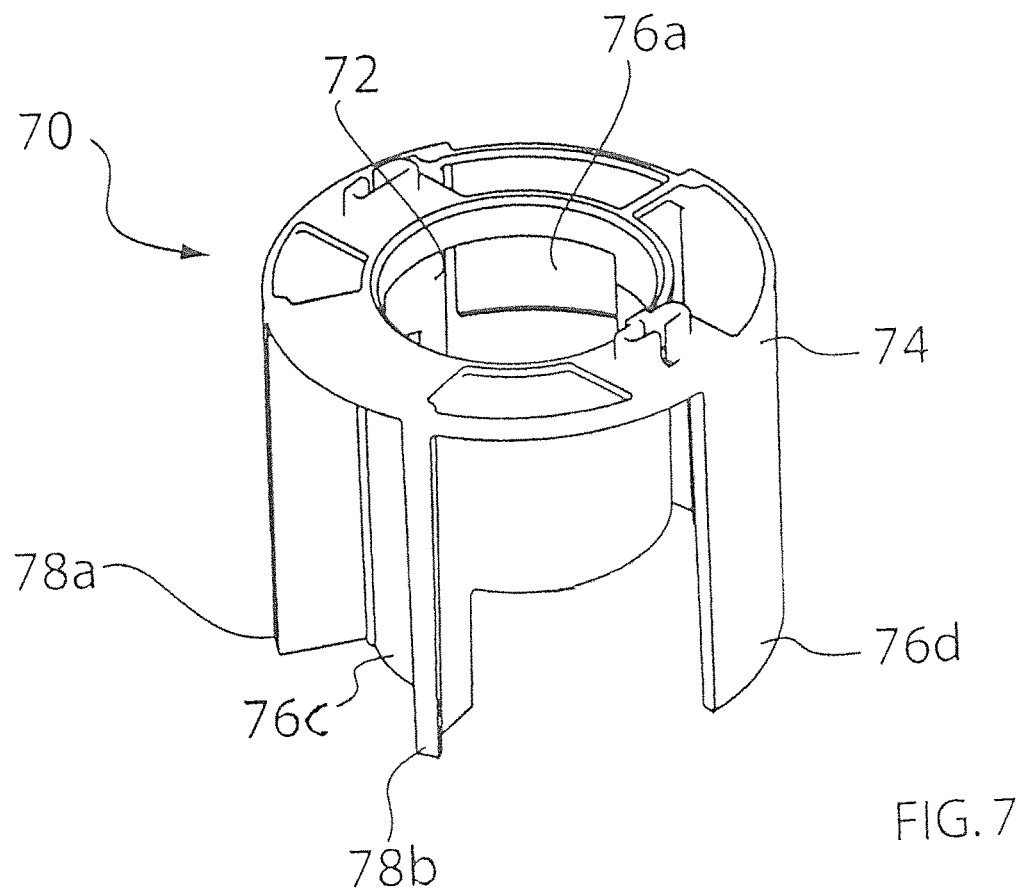

As shown in FIG. 7, the lower cylindrical body 70 comprises an inner cylindrical wall 72 whose diameter is substantially equal to the outer diameter of the control tube 60 and an outer cylindrical wall 74.

The outer cylindrical wall 74 is shaped in different ways and, more precisely, there are 4 different cylindrical sectors:

a first cylindrical sector 76a where at the lower part there is the outer cylindrical wall 74 and at the upper part the outer cylindrical wall 74 is absent;

a second cylindrical sector where at the lower part the outer cylindrical wall 74 is absent and at the upper part the outer cylindrical wall 74 is present;

a third cylindrical sector 76c where, both at the lower and upper part, the outer cylindrical wall 74 is absent but this sector is delimited by two radial walls 78a, 78b;

a fourth cylindrical sector 76d where, both at the lower and upper part, the outer cylindrical wall 74 is present.

Figure 6:
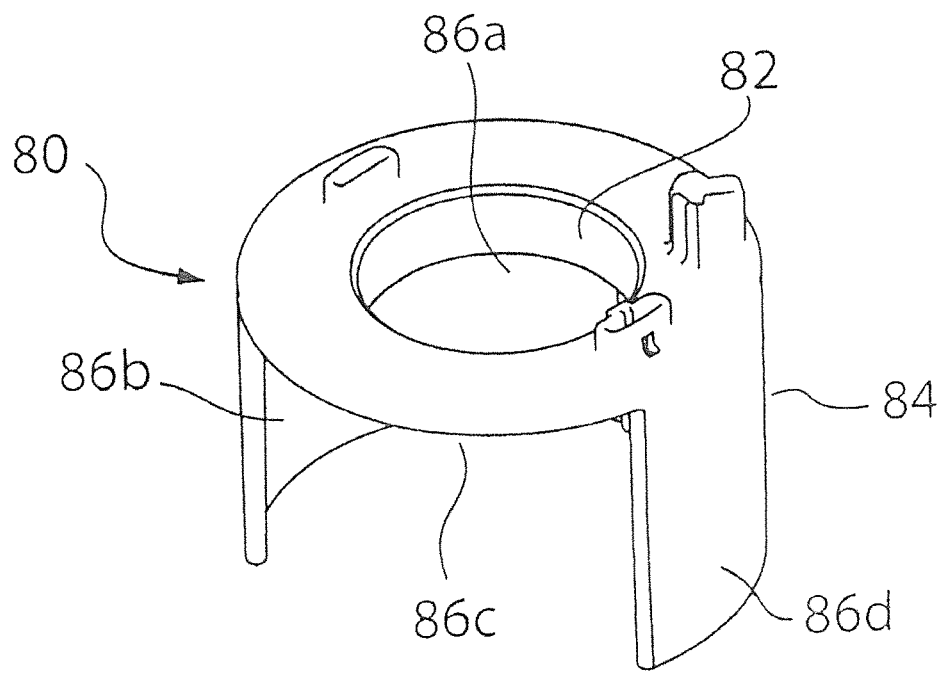
FIGS. 6 and 7 are two perspective views of two cylindrical bodies of the flow control device of FIG. 4.

As shown in FIG. 6. the upper cylindrical body 80 comprises an inner cylindrical wall 82 the diameter of which is essentially equal to the outer diameter of the control tube 60 and an outer cylindrical wall 84.

The outer cylindrical wall 84 is shaped in different ways and, more precisely, there are 4 different cylindrical sectors:

a first cylindrical sector 86a where the outer cylindrical wall 84 is present;

a second cylindrical sector 86b where the outer cylindrical wall 84 is present;

a third cylindrical sector 86c where the outer cylindrical wall 84 is absent;

a fourth cylindrical sector 86d where the outer cylindrical wall 84 is present.

The first cylindrical sector 76a, the second cylindrical sector, the third cylindrical sector 76c and the fourth cylindrical sector 76d of the lower cylindrical body 70 are axially aligned respectively with the first cylindrical sector 86a, the second cylindrical sector 86b, the third cylindrical sector 86c and the fourth cylindrical sector 86d of the upper cylindrical body 80.

Figure 8:
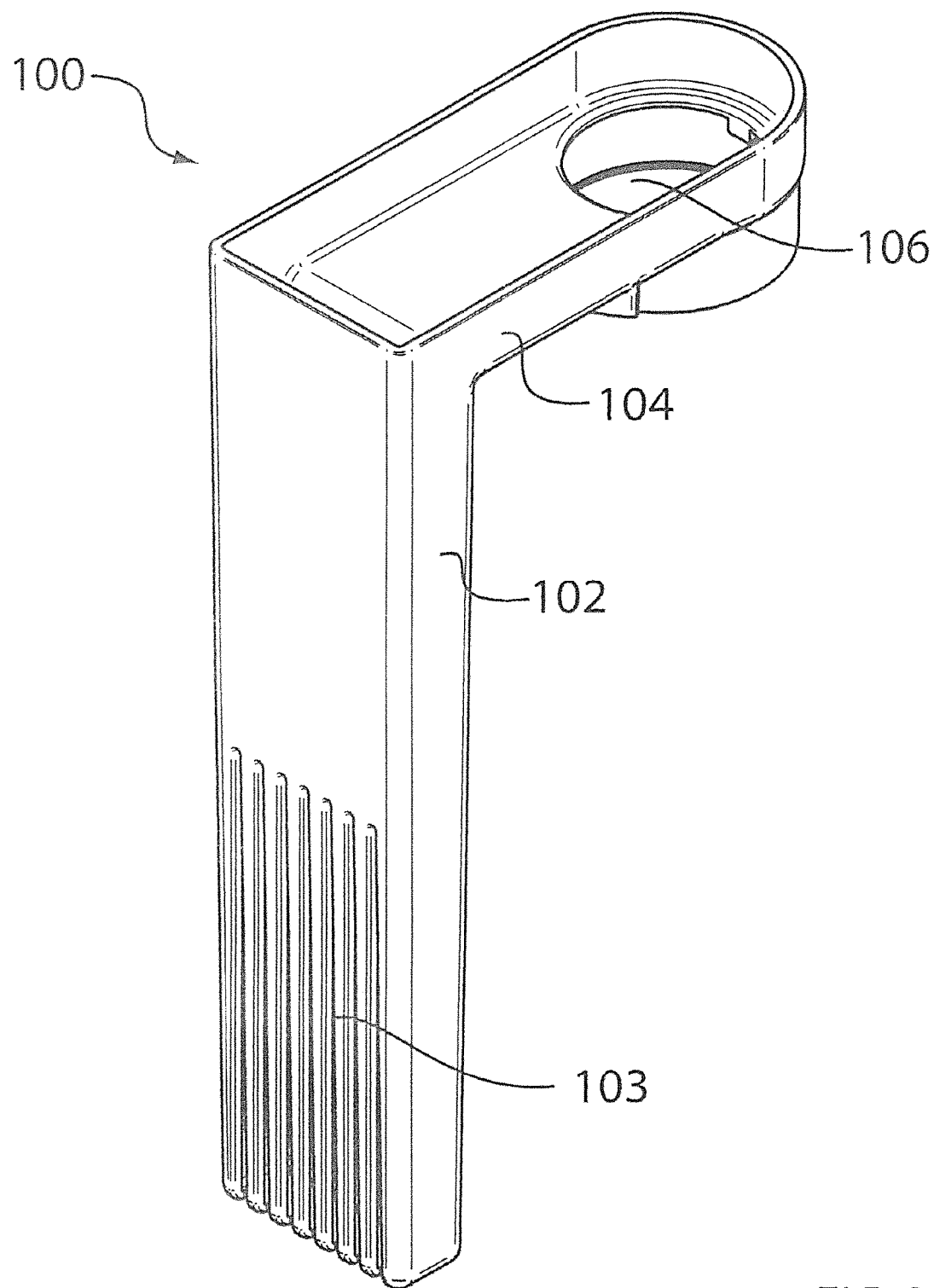
FIG. 8 is a perspective view of a suction duct.

A L-shaped conveying element 100 (better illustrated in FIG. 8) is positioned on the control device 50 an it has a hollow vertical portion 102 and a horizontal portion or duct 104. Slots 103 are formed at the lower end of the vertical portion 102 through which the water of the aquarium enters, while an opening 106 is made at the free end of the duct 104.

The duct 104 is then closed by a cover 108, as shown in FIG. 4.

The conveying element 100 is mounted on the control device 50 so that inside the opening 106 is inserted the upper end 60b of the control tube 60 so that, the water taken from the aquarium through the slots 103, passes through the conveying element 100 and enters into the control tube 60.

The control device 50 also includes an adjusting knob 110 positioned above the cover 108 of the duct 104.

The adjusting knob 110 comprises a stem 112 projecting downwards that engages a corresponding recess 89 made on the upper cylindrical body 80.

Thus, it results that the adjusting knob 110, the lower cylindrical body 70, the upper cylindrical body 80, the spacer 90 and the adjusting knob 110 are integral between them. Then, by rotating the knob 110, both the lower cylindrical body 70 and the upper cylindrical body 80 is rotated all together.

The control device 50 is then inserted inside the second portion 34 of the container 30.

The filtering device 20 also includes a support plate 150, a discharge tube 160 and a holder 170.

Figure 11:
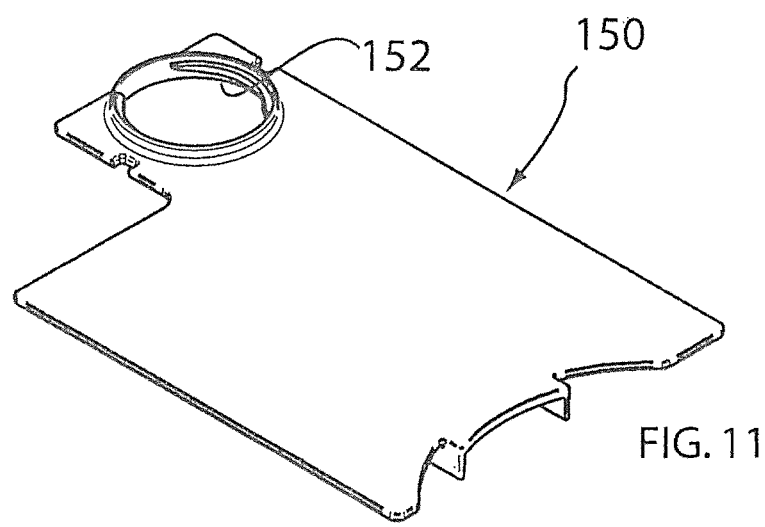
FIG. 11 is a perspective view of a bottom or support plate inserted inside the container of FIG. 3.

The support plate 150 (see FIG. 11) has a shape substantially corresponding to the shape of the bottom of the first portion 32, and it has a hole 152.

Figure 9:
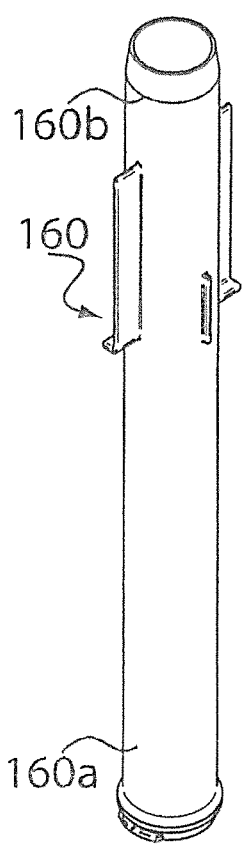
FIG. 9 is a perspective view of a discharge duct.

Instead, the discharge tube 160 (see FIG. 9) has a lower end 160a and an upper end 160b. The diameter of the discharge tube 160 substantially corresponds to the diameter of the hole 152 of the support plate 150, so that the lower end 160a of the discharge tube 160 can be attached to the hole 152.

Figure 10:
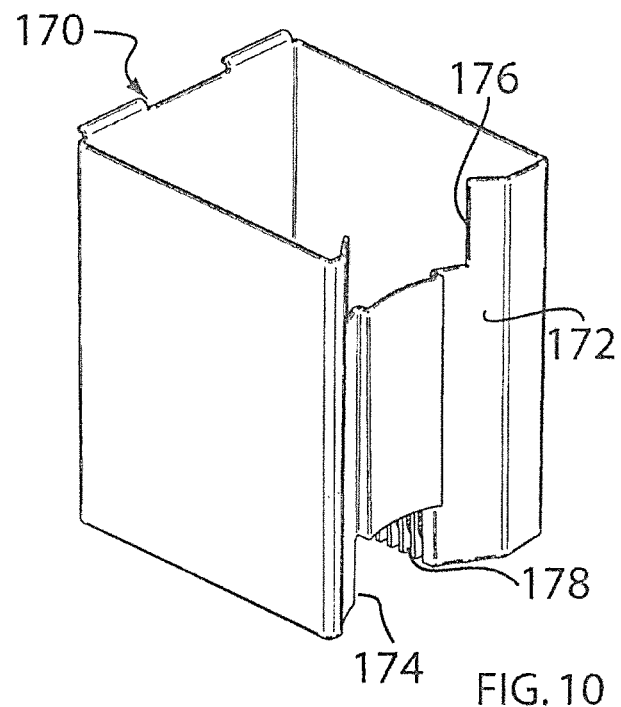
FIG. 10 is a perspective view of a holder inserted inside the container of FIG. 3.

The holder 170 (see FIG. 10) has an essentially parallelepipedic shape and it has a side wall 172 at the lower end of which a longitudinal recess 174 is made, while there is an opening 176 on upper end. Slots 178 are made on the bottom of holder 170 corresponding to the longitudinal recess 174.

Figure 12:
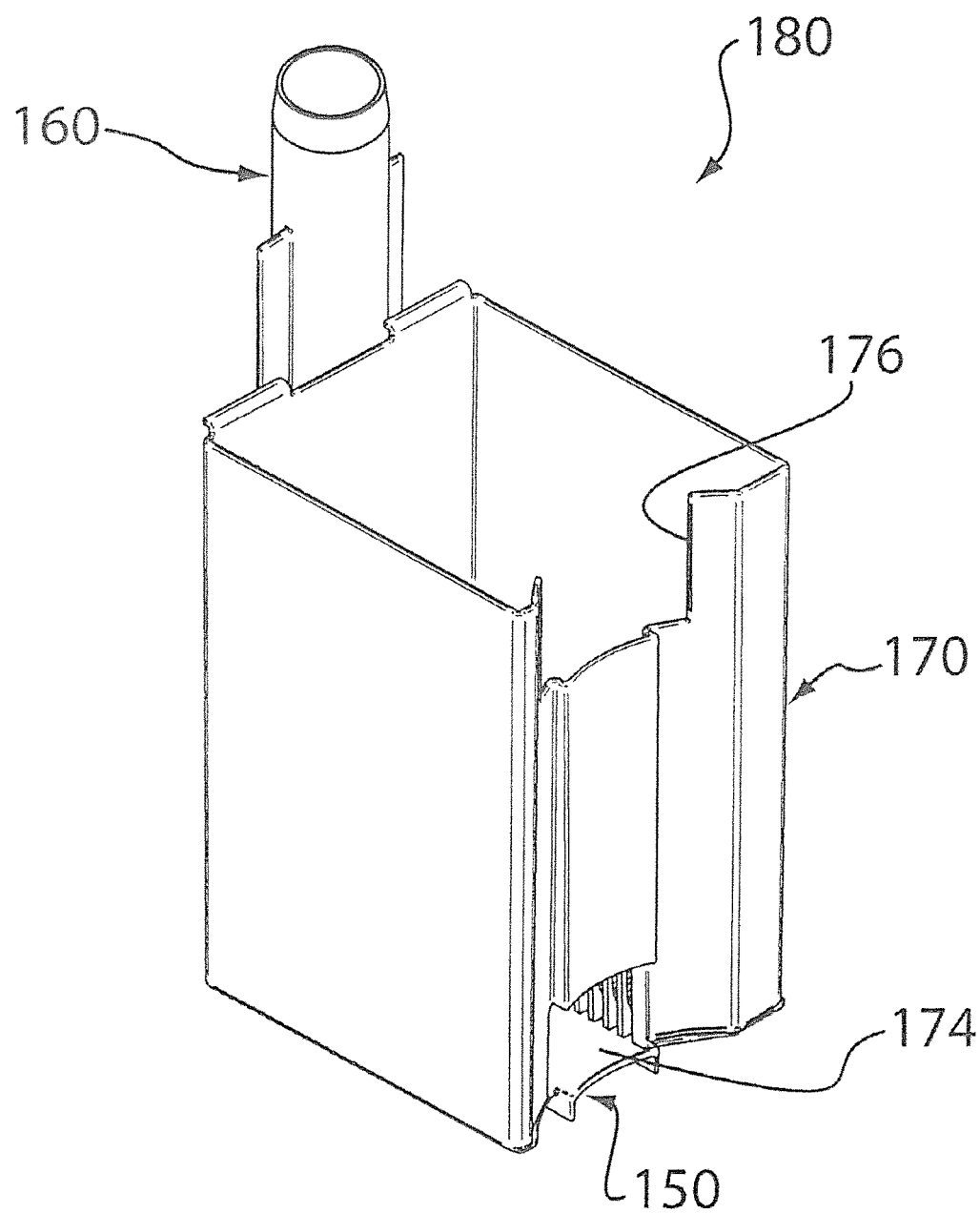
FIG. 12 is a perspective view of the assembly of the discharge tube, holder and the bottom plate of FIGS. 9, 10 and 11.

As illustrated in FIG. 12, the holder 170 and the discharge tube 160 are placed above the support plate 150, so that the lower end 160a of the tube 160 engages the hole 152 of the support plate 150, so obtaining the assembly 180 shown in FIG. 12. The assembly 180 is then inserted into the first portion 32 of the container 30 (see FIG. 1). In this way, the support plate 150 is located above the discharge duct 44 which is then closed. Moreover, the hole 152 of the support plate 150 is located just at the second end 44b of the discharge duct 44, so water that enters from the first end 44a, after passing through the discharge duct 44, rises upwards inside the discharge tube 160.

It is worthing note that the side wall 172 of the holder 170 closes the vertical opening 36 between the first portion 32 and second portion 34 and, at the same time, the longitudinal recess 174 forms and defines a lower inlet 174 through which the water taken from the aquarium can enter into the holder 170, while the opening 176 of the holder 170 forms and defines an upper inlet 176 through which the water taken from the aquarium can enter into the holder 170.

Figure 13:
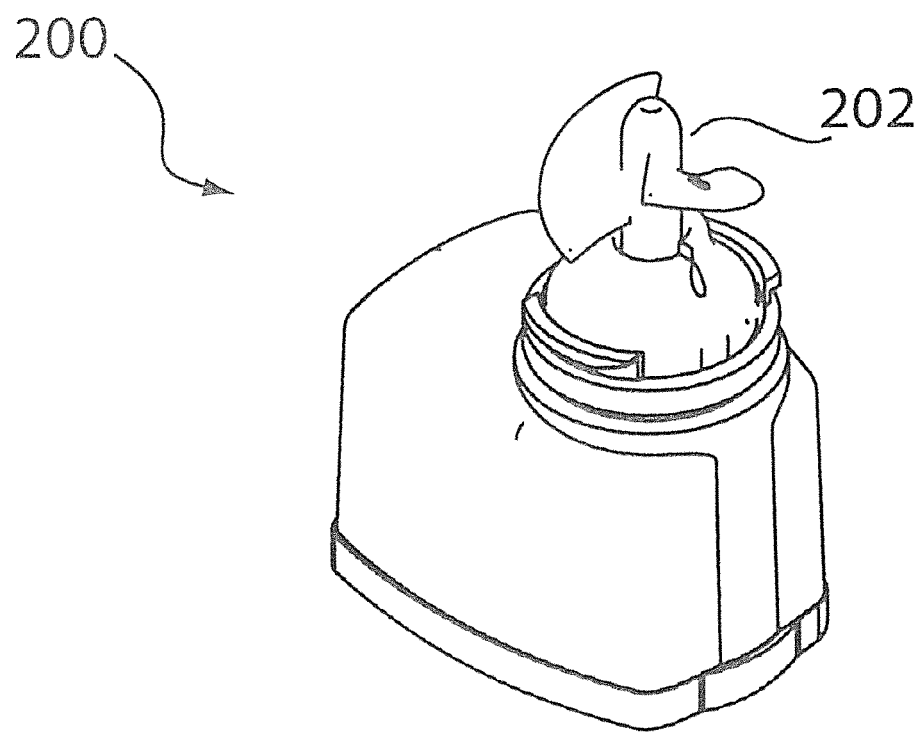
FIG. 13 is a perspective view of the pump of the device of FIG. 1.

As illustrated in FIG. 1, a pump 200 is mounted at the lower position of the second portion 34 and it is provided with an axial impeller 202, as better illustrated in FIG. 13.

It can be noted that the axial impeller 202 is inserted inside the control tube 60.

The filtering device 20, once it has been assembled as described above, it is applied on the outer wall 210 of an aquarium using the tabs 38 and 40 in order to be hooked onto the upper edge of the wall of the aquarium, as illustrated in FIG. 2.

The 4 operation modes of the filtering device 20 are illustrated in FIGS. 14, 15, 16 and 17 and they are respectively:
  filtering, mode;
  washing primer mode or backwash primer mode;
  washing mode or backwash mode;
  fish feeding mode.

The four operating modes are obtained simply by rotating the adjusting knob 110.

In the filtering mode, the adjusting knob 110 is rotated so that the first cylindrical sector 76a of the lower cylindrical body 70 is positioned in front of the discharge outlet 44a and the lower inlet 174 and the first cylindrical sector 86a of the upper cylindrical body 80 is positioned in front of the upper inlet 176.

In this way, the outer cylindrical wall 74 of the lower cylindrical body 70 closes the discharge outlet 44a and keeps the lower inlet 174 open, while the outer cylindrical wall 84 of the upper cylindrical body 80 closes the upper inlet 176.

Figure 14:
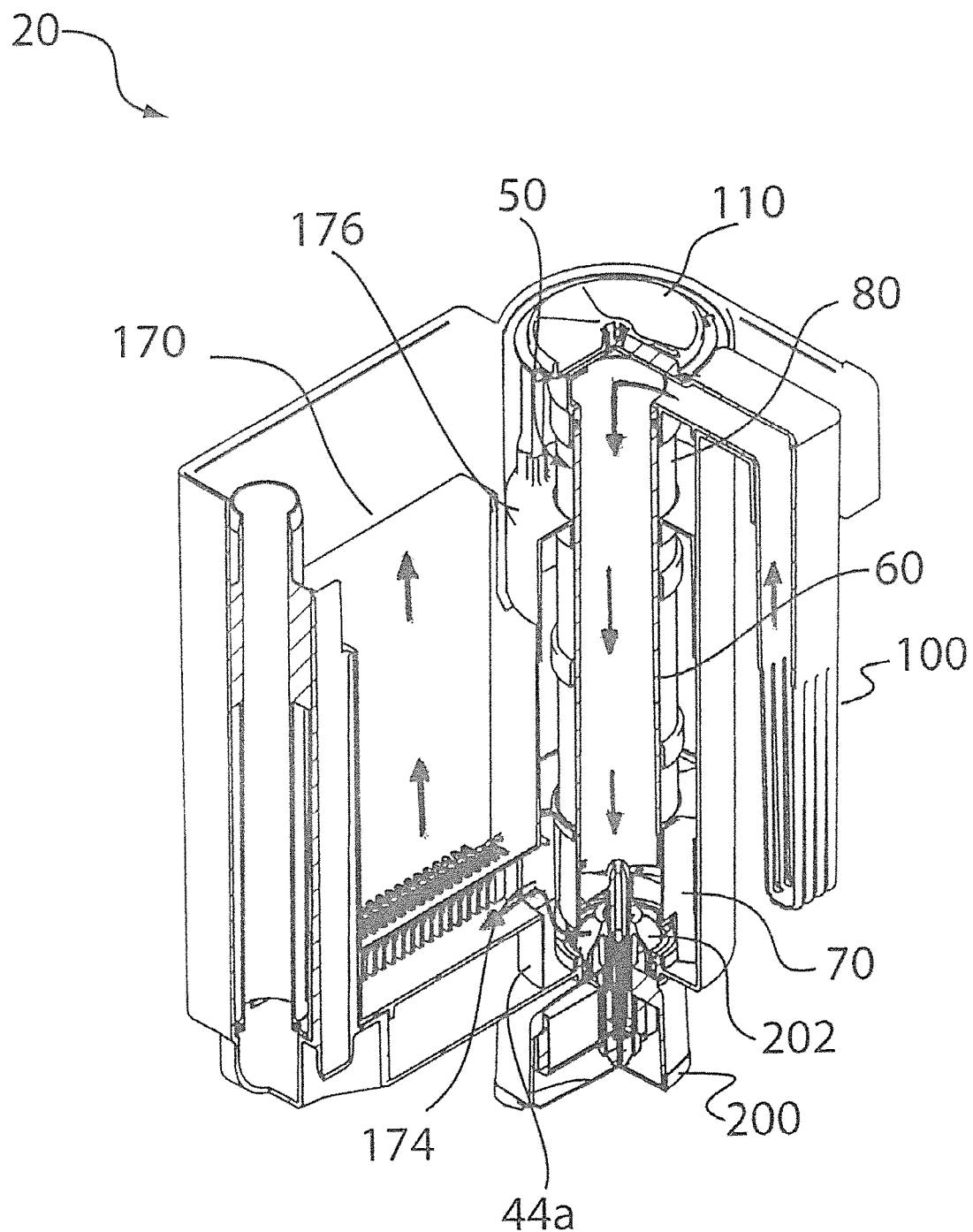
FIGS. 14, 15, 16 and 17 are perspective views of the device of FIG. 1 illustrating the different operating modes.

As depicted by the arrows of FIG. 14 that indicate the water flow, after activating the pump 200, water is sucked through the slots 103 of the conveying element 100. The water flows inside the conveying element 100 and, then, inside the control tube 60 and, pushed by the impeller 202, comes out from the openings 62 of the control tube 60, is put into the bottom of the holder 170 through the lower inlet 174, rises upwards along the holder 170 and, passing through the filters (not shown) contained in the holder, is filtered. The water thus filtered flows out from the holder 170 through the first tab 38 positioned on top of the holder 170.

In the washing primer mode or backwash primer mode, the adjusting knob 110 is rotated so that the second cylindrical sector of the lower cylindrical body 70 is positioned in front of the discharge outlet 44a and the lower inlet 174, and the second cylindrical sector 86b of the upper cylindrical body 80 is positioned in front of the upper inlet 176.

In this way, the outer cylindrical wall 74 of the lower cylindrical body 70 keeps the discharge outlet 44a open and closes the lower inlet 174, while the outer cylindrical wall 84 of the upper cylindrical body 80 closes the upper inlet 176.

Figure 15:
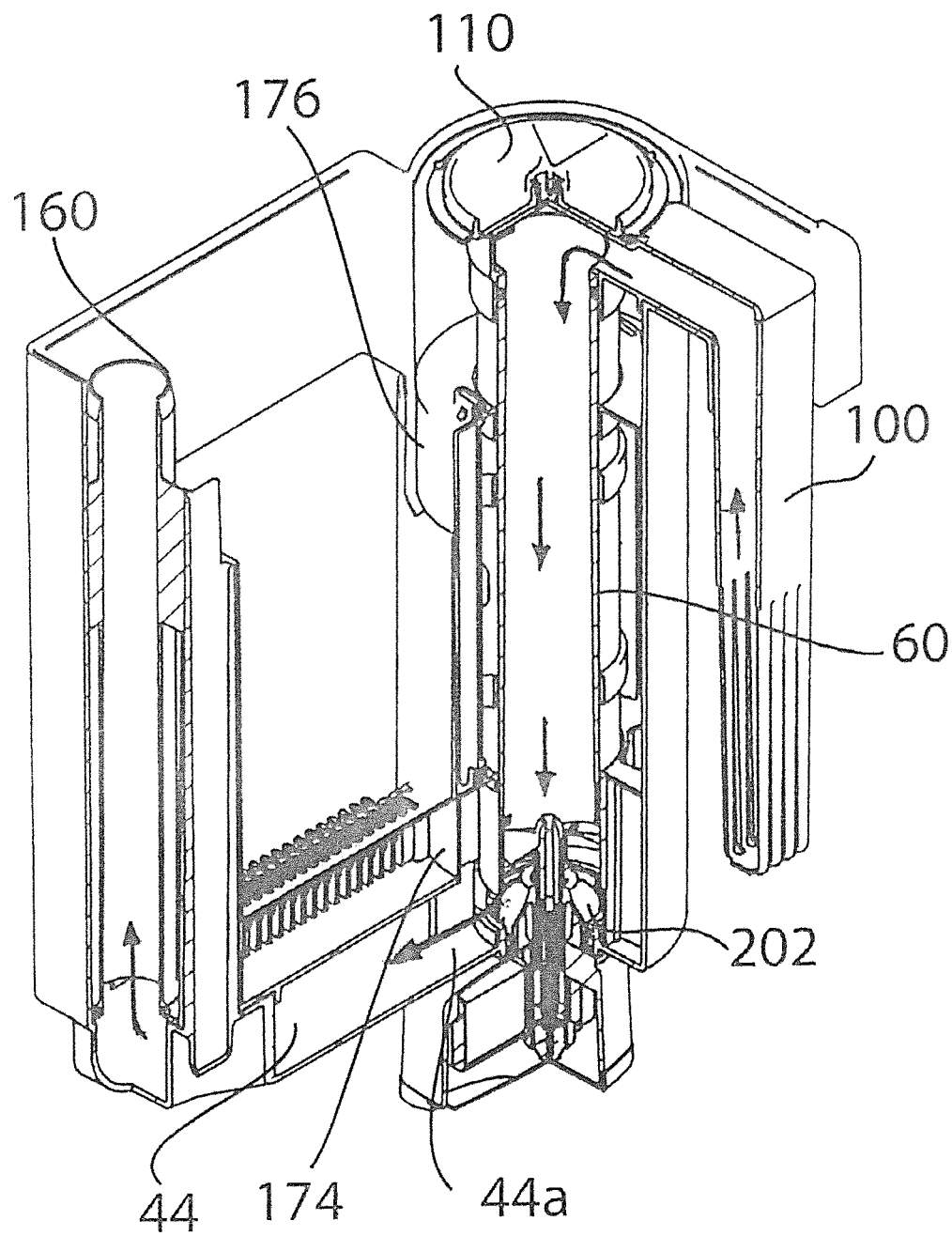

As depicted by the arrows in FIG. 15 which indicate the flow of water, thanks to the pump 200, water is sucked from the slots 103, flows inside the conveying element 100 and then inside the control tube 60 and, pushed by the impeller 202, passes through the discharge outlet 44a and flows inside the discharge duct 44 where it is then discharged through the discharge tube 160.

This position is useful to activate the following phase, namely the washing or backwash phase.

In the washing or backwash mode, the adjusting knob 110 is rotated so that the third cylindrical sector 76c of the lower cylindrical body 70 is positioned in front of the discharge outlet 44a and the lower inlet 174, and the third cylindrical sector 86c of the upper cylindrical body 80 is positioned in front of the upper inlet 176.

In this way, the outer cylindrical wall 74 and the two radial walls 78a, 78b of the lower cylindrical body 70 put in communication the discharge outlet 44a and the lower inlet 174, while the outer cylindrical wall 84 of the upper cylindrical body 80 opens the upper inlet 176.

Figure 16:
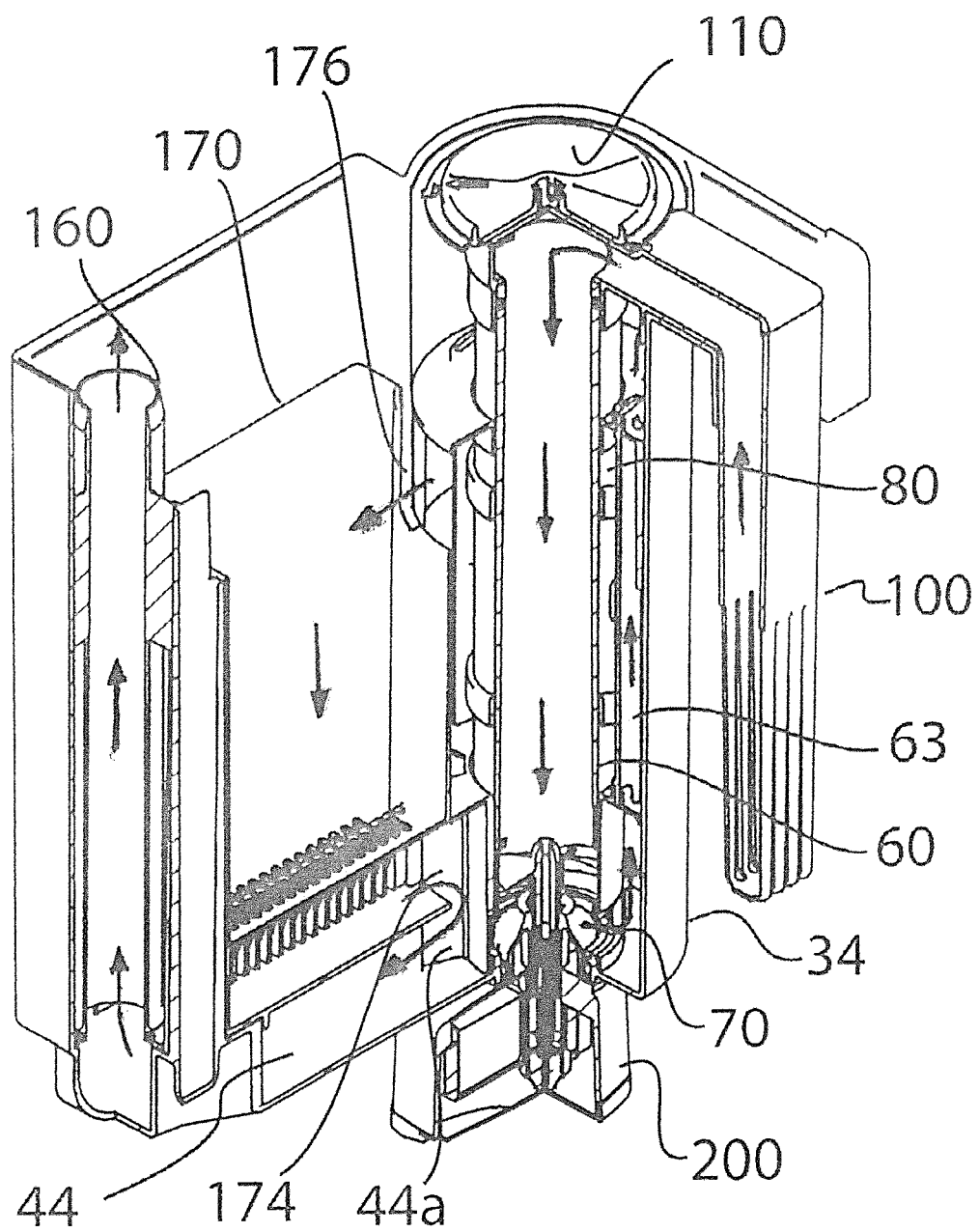

As depicted by the arrows in FIG. 16 that indicate the flow of water, thanks to the pump 200, water is sucked from the slots 103, flows inside the conveying element 100 and then inside the control tube 60 and, pushed by the impeller 202, flows upwards inside the hollow space 63 formed between the second cylindrical portion 34 and the control tube 60, passes through the upper inlet 176, enters the holder 170 where it goes downwards by gravity, passes through the filters contained in the holder 170, passes through the lower inlet 174 and the discharge outlet 44a since they are connected, flows inside the discharge duct 44 and, finally, is expelled outside through the discharge tube 160. In this way, water is taken from the aquarium, but the water passes through the filter in the opposite direction, namely the flow of water which passes through the filters is reversed compared to the previous washing mode, so the filters are washed and the dirty water is expelled outside the aquarium.

In this way, while in the previous phase the lower inlet 174 was the passage through which, water entered into the holder 170 now, in the washing mode. the upper inlet 176 becomes the passage through which the water enters into the holder 170.

It is evident that it is necessary to add to the aquarium an amount of water essentially equal to that it has been taken.

It can be noted that it is necessary to reverse the flow of water because the dirtier part of the filter is the part that is first affected by the flow of water in the filtering phase and thus, reversing the flow during the cleaning phase (backwash phase), the water comes from the cleaner side of the filter and comes out from the dirtier side thus making possible the cleaning of the filter.

Besides, if the flow is not inverted during the washing operation, the filter would continue to perform its filtering function and it would not be at all possible to clean it. By reversing the water flow, water is able to drag dirt contained in the filters, and then to clean them.

Moreover, the filters usually have a more and more higher filtration rate from the entry side towards the exit side of water. Then, all the more reason, it is necessary to reverse the flow of water which first affects the part of the filter with lower filtration rate and, at the end, the part of the filter with a greater filtration rate.

In fish feeding mode, the adjusting knob 110 is rotated so that the fourth cylindrical sector 76d of the lower cylindrical body 70 is positioned in front of the discharge outlet 44a and the lower inlet 174, and the fourth cylindrical sector 86d of the upper cylindrical body 80 is positioned in front of the upper inlet 176.

In this way, the outer cylindrical wall 74 of the lower cylindrical body 70 closes the discharge outlet 44a and the lower inlet 174, and the outer cylindrical wall 84 of the upper cylindrical body 80 closes the upper inlet 176.

Figure 17:
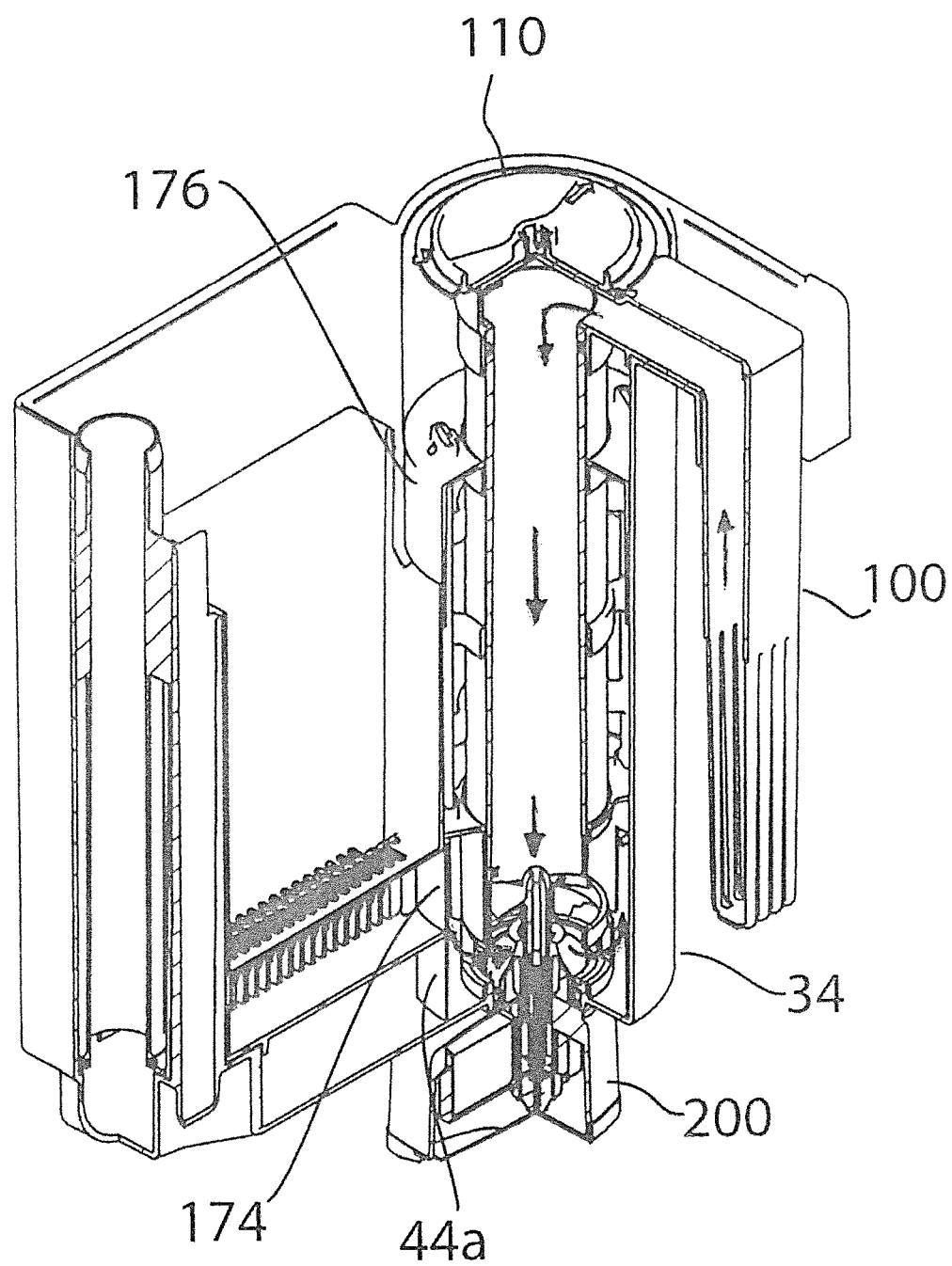

As depicted by the arrows in FIG. 17 which indicate the flow of water, thanks to the pump 200, water is sucked from the slots 103, flows inside the conveying element 100 and, then, inside the control tube 60. Since the discharge outlet 44a, the lower inlet 174 and the upper inlet 176 are closed, the water pushed by the impeller 202 has no chance to be expelled and, then, circulates near the pump 200 in the lower part of the second cylindrical portion 34 thereby interrupting the further withdrawal of water from the aquarium.

This function is activated for example when food is introduced into the aquarium to feed fish, thus avoiding that food passes through the filters, and then it is wasted and/or dirties unnecessarily the filters.

It can noted that it is possible to automate these operations.

For example, it is possible to apply a motor to the adjusting knob 110 able to cause the control device 50 to take the different operating positions. Preferably, the motor is connected to a timer so as to program the different operating positions.

The advantages achieved by the filtering device 20 are evident since, by simply rotating the adjusting knob 110, it is possible to cause the filtering device 20 to perform different functions in addition to the traditional filtering water, as described above.

The transition from one mode to another and, in particular, from the filtering mode to the cleaning mode and vice versa is done in a very simple and fast way.

Even if it has multiple functions, the device is nevertheless simple, and therefore not very expensive.

Moreover, thanks to the ease of disassembly and reassembly, its maintenance is quite simple.

Furthermore, the filtering device 20 can be applied to any aquarium without any difficulty and without requiring any adjustment or modification, neither to the aquarium nor to the device.

Finally, thanks to the possibility to program the different functions, in particular the function of cleaning of the filters, so that it takes place in an automatic way, it is no longer necessary to remember to do it periodically.

It is obvious that any change which is conceptually or functionally equivalent falls within the scope of the present invention.

For example, it is possible to realize the filtering device with the only functions of filtering and washing filters.

It is also possible to perform the reversal of the water flow inside the filter by equivalent systems.

For example, it is possible to provide a deflector able to divert the flow of water drawn from the aquarium into the lower inlet or the upper inlet depending respectively if the device has to perform the function of filtering or cleaning of the filters.

The invention claimed is:

1. A filtering device to draw water from an aquarium and circulate the water inside said device, said device comprising:
 a container comprising a first housing portion and a second housing portion containing a flow control device and placed adjacent to the first housing portion, the first housing portion having a first lower inlet made between the first housing portion and the second housing portion in a lower position and a second upper inlet made between the first housing portion and the second housing portion in an upper position to allow the entry of water taken from said aquarium into said first housing portion, a discharge outlet connected to a discharge duct being made in the second housing portion below the first lower inlet, said first housing portion being able to contain at least one filter in order to filter water, the second housing portion being able to contain a flow control device having an entry for taking water from said aquarium;
 wherein the flow control device has two operating positions, a first operating position and a second operating position, the first operating position being a filtering position and the second operating position being a cleaning or backwash position;
 wherein in the first operating position, said entry is in communication with said first lower inlet, so that water is taken from said aquarium and put into said first housing portion through said first lower inlet, water passing through said first housing portion being filtered and then put back into the aquarium, wherein the discharge outlet is closed, the first lower inlet is opened and the second upper inlet is closed, so that water to be filtered is taken from the aquarium, sent into said second housing portion and then, through said first lower inlet, sent into the first housing portion while rising up is filtered and then put back into the aquarium;
 wherein in the second operating position, said entry is in communication with said second upper inlet, so that water taken from said aquarium enters into said first housing portion through said second upper inlet, so reversing the flow of water inside said first housing portion, water passing through said first housing portion in the opposite direction to the previous one, cleaning the at least one filter and then being discharged, wherein said discharge outlet and said first lower inlet are closed but on the side of the first housing portion they are connected between them, so that water is taken from said aquarium, sent into said second housing portion and then, through said second upper inlet, sent into said first housing portion where it flows down cleaning said at least one filter and, through the lower inlet and said discharge outlet connected with each other, it enters into the discharge duct where it is discharged.

2. The filtering device according to claim 1, characterized in that said flow control device comprises a third operating position or primer position, wherein said first lower inlet and said second upper inlet are closed and said discharge outlet is opened, water is taken from said aquarium, sent into said second portion and, through said discharge outlet, water is sent directly to said discharge duct where it is discharged, said third operating position being activated prior to the second operating position to facilitate the operation of the filtering device in a second operating or washing mode.

3. The filtering device according to claim 2, characterized in that said flow control device comprises a fourth operating position or stand-by position, wherein said first lower inlet, said second upper inlet and said discharge outlet are closed, so that water is taken from said aquarium, sent into said second portion but, having no possibility of being ejected, further withdrawal of water from said aquarium is interrupted, said fourth position being activated for example when food is introduced in the aquarium, thus avoiding that food is filtered by the filtering device.

4. The filtering device according to claim 1, characterized in that said second portion is substantially cylindrical and said flow control device comprises a control tube having a lower cylindrical body and an upper cylindrical body, said control tube is rotatable inside said second cylindrical portion, said lower cylindrical body being shaped so as to open or close said first lower inlet and open or close said discharge outlet by rotating said control tube, said upper cylindrical body being able to open or close said second upper inlet by rotating said control tube, so that by rotating said control tube, the flow control device takes said operating positions.

5. The filtering device according to claim 4, characterized in that said first lower cylindrical body and said second upper cylindrical body have outer diameters substantially equal to the inner diameter of said second cylindrical portion.

6. The filtering device according to claim 4, characterized in that said control tube is a tube inside which water, taken from said aquarium, flows and is sent to said first lower inlet and/or said second upper inlet and/or said discharge outlet.

7. The filtering device according to claim 1, characterized in said filtering device comprises a pump to circulate water inside said device.

8. The filtering device according to claim 7, characterized in that said pump is an axial pump.

9. The filtering device according to claim 1, characterized in that in said first portion is contained in a holder inside which said at least one filter is inserted, in said holder said first lower inlet and said second upper inlet are made.

10. The filtering device according to claim 1, characterized in that said flow control device comprises a motor able to cause said control device to take different operating positions.

11. The filtering device of claim 10, wherein the different operating positions include the first and second operating positions.

12. The filtering device according to claim 1, characterized in that said device comprises a timer connected with said motor, so as to program different operating positions.

13. The filtering device of claim 12, wherein the different operating positions include the first and second operating positions.

* * * * *